US012679376B2

(12) United States Patent
Sefati et al.

(10) Patent No.:  US 12,679,376 B2
(45) Date of Patent:      Jul. 14, 2026

(54) LANE CHANGING BASED ON A LANE CHANGE RIGHT-OF-WAY COST

(71) Applicant: Zoox, Inc., Foster City, CA (US)

(72) Inventors: Shahriar Sefati, San Francisco, CA (US); Colby Glacier Chang, San Francisco, CA (US); Joona Markus Petteri Kiiski, Cupertino, CA (US); Genie Kim, San Francisco, CA (US); Dhanushka Nirmevan Kularatne, Castro Valley, CA (US); Joseph Lorenzetti, Foster City, CA (US); Olivier Amaury Toupet, Escondido, CA (US); Marc Wimmershoff, Redwood City, CA (US); Rick Zhang, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 74 days.

(21) Appl. No.: 18/651,369

(22) Filed: Apr. 30, 2024

(65) Prior Publication Data

US 2025/0333062 A1      Oct. 30, 2025

(51) Int. Cl.
*B60W 30/00* (2006.01)
*B60W 30/18* (2012.01)
*B60W 60/00* (2020.01)

(52) U.S. Cl.
CPC .. *B60W 30/18163* (2013.01); *B60W 60/0015* (2020.02); *B60W 2554/802* (2020.02); *B60W 2555/60* (2020.02)

(58) Field of Classification Search
CPC ....... B60W 30/18163; B60W 60/0015; B60W 2554/802; B60W 2555/60
See application file for complete search history.

(56) References Cited

U.S. PATENT DOCUMENTS 10,259,458 B2 *  4/2019  Yoo ................. B60W 30/18163
11,377,145 B2 *  7/2022  Ozawa ................... B62D 6/002
(Continued)

FOREIGN PATENT DOCUMENTS

CN         115626182 A       1/2023
EP           3916696 A1      12/2021
WO     WO2021034969 A1      2/2021

OTHER PUBLICATIONS

Search Report and Written Opinion for International Application No. PCT/US2025/025325, Dated Aug. 8, 2025, 13 pages.

*Primary Examiner* — Logan M Kraft
*Assistant Examiner* — Sherman D Manley
(74) *Attorney, Agent, or Firm* — Lee & Hayes, P.C.

(57)            ABSTRACT

Techniques for evaluating lane changing candidate trajectories are described herein. A vehicle may generate one or more candidate trajectories to follow within an environment. One or more of the candidate trajectories may be lane changing trajectories. As such, the vehicle may determine a lane changing cost associated with following the lane changing candidate trajectories to evaluate the degree to which the candidate trajectory respects the right-of-way of the object(s) located in the target lane. Accordingly, when generating the lane changing cost, the vehicle may determine that a relevant object is located within the target lane. Based on the object being longitudinally behind the vehicle, the vehicle may determine one or more sub-costs that may be combined into the lane changing cost. The vehicle may associate the lane change cost to the corresponding candidate trajectory and select (or determine) to follow the candidate trajectory based on the cost value.

20 Claims, 6 Drawing Sheets

(56) References Cited

U.S. PATENT DOCUMENTS

| | | | | |
|---|---|---|---|---|
| 11,396,291 | B2 * | 7/2022 | Kobayashi | B60W 30/12 |
| 11,498,617 | B2 * | 11/2022 | Akamatsu | B60W 30/12 |
| 11,753,014 | B2 * | 9/2023 | Yarmohamadi | B60W 30/18163 |
| | | | | 701/23 |
| 12,214,823 | B2 * | 2/2025 | Takahashi | B60W 30/12 |
| 2005/0228588 | A1 * | 10/2005 | Braeuchle | B60W 50/0097 |
| | | | | 701/301 |
| 2013/0226406 | A1 * | 8/2013 | Ueda | B62D 1/28 |
| | | | | 701/41 |
| 2017/0269602 | A1 * | 9/2017 | Nakamura | G01C 21/3492 |
| 2018/0141588 | A1 * | 5/2018 | Shimizu | B62D 15/0265 |
| 2019/0217883 | A1 * | 7/2019 | Ozawa | B62D 6/002 |
| 2020/0156631 | A1 * | 5/2020 | Lin | G05D 1/0257 |
| 2020/0269873 | A1 | 8/2020 | Liu et al. | |
| 2020/0307589 | A1 | 10/2020 | Li et al. | |
| 2021/0016779 | A1 * | 1/2021 | Gillet | B60W 30/18163 |
| 2021/0024059 | A1 * | 1/2021 | Miyamoto | B60W 30/095 |
| 2021/0263519 | A1 * | 8/2021 | Ogino | B60W 60/0015 |
| 2022/0126822 | A1 * | 4/2022 | Wang | B60W 50/0097 |
| 2022/0340137 | A1 * | 10/2022 | Ollis | B60W 30/09 |
| 2023/0150488 | A1 * | 5/2023 | Miyamoto | B60W 10/184 |
| | | | | 701/41 |
| 2023/0192190 | A1 * | 6/2023 | Takahashi | B62D 15/0255 |
| | | | | 701/41 |
| 2024/0025412 | A1 * | 1/2024 | Zhang | B60W 40/02 |
| 2024/0132075 | A1 * | 4/2024 | Hata | B60W 40/02 |

* cited by examiner

Figure 2:
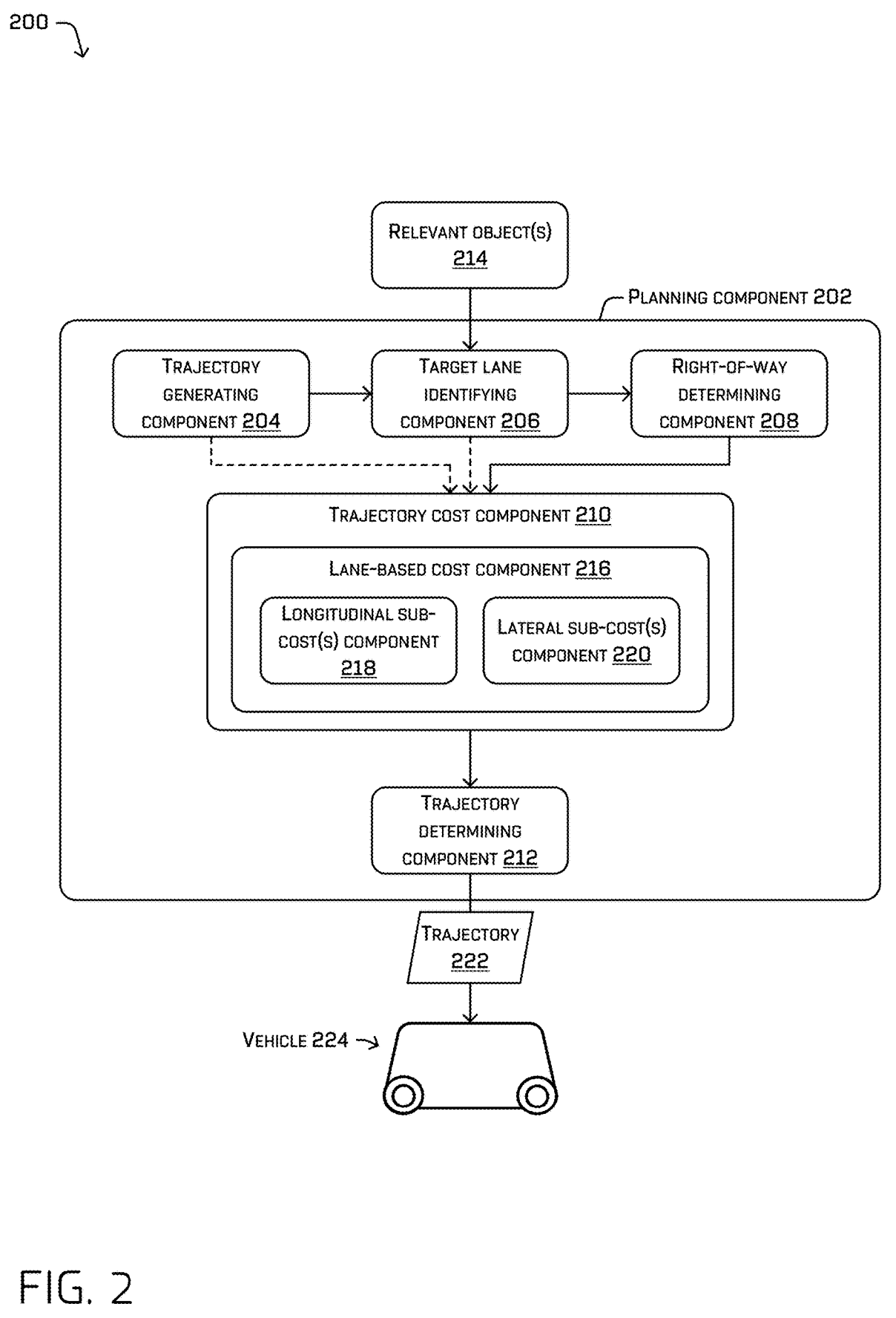

200

RELEVANT OBJECT(S)
214

┌─ PLANNING COMPONENT 202

TRAJECTORY
GENERATING
COMPONENT 204

TARGET LANE
IDENTIFYING
COMPONENT 206

RIGHT-OF-WAY
DETERMINING
COMPONENT 208

TRAJECTORY COST COMPONENT 210

LANE-BASED COST COMPONENT 216

LONGITUDINAL SUB-
COST(S) COMPONENT
218

LATERAL SUB-COST(S)
COMPONENT 220

TRAJECTORY
DETERMINING
COMPONENT 212

TRAJECTORY
222

VEHICLE 224 →

LATERAL
SAFETY
COST
406

0

408

1.5    3

TIME 404

410

1

LONGITUDINAL
SAFETY COST
414

0

416

1    3

TIME 412

600 ⟍

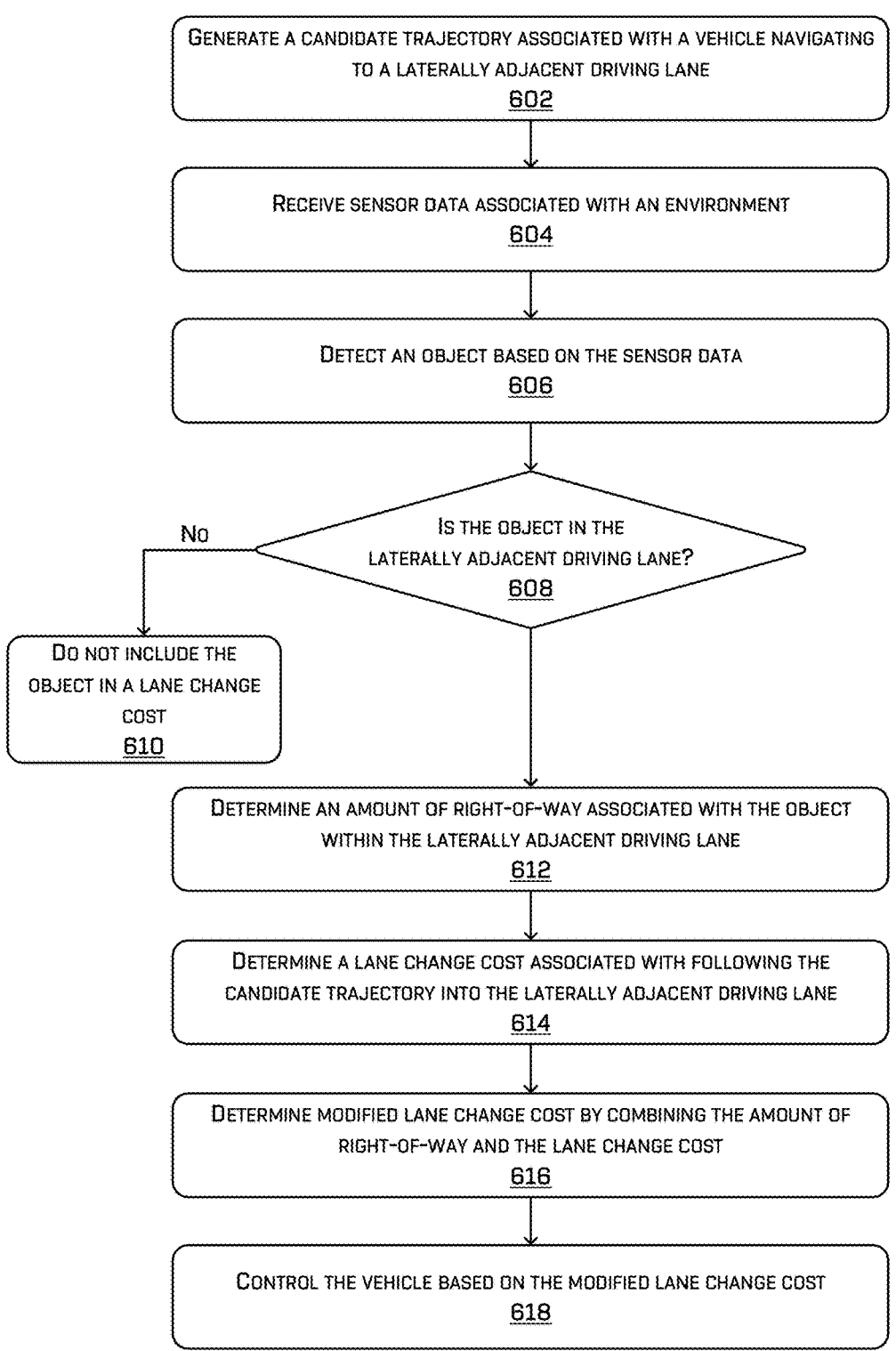

GENERATE A CANDIDATE TRAJECTORY ASSOCIATED WITH A VEHICLE NAVIGATING TO A LATERALLY ADJACENT DRIVING LANE
602

RECEIVE SENSOR DATA ASSOCIATED WITH AN ENVIRONMENT
604

DETECT AN OBJECT BASED ON THE SENSOR DATA
606

IS THE OBJECT IN THE LATERALLY ADJACENT DRIVING LANE?
608

No

DO NOT INCLUDE THE OBJECT IN A LANE CHANGE COST
610

DETERMINE AN AMOUNT OF RIGHT-OF-WAY ASSOCIATED WITH THE OBJECT WITHIN THE LATERALLY ADJACENT DRIVING LANE
612

DETERMINE A LANE CHANGE COST ASSOCIATED WITH FOLLOWING THE CANDIDATE TRAJECTORY INTO THE LATERALLY ADJACENT DRIVING LANE
614

DETERMINE MODIFIED LANE CHANGE COST BY COMBINING THE AMOUNT OF RIGHT-OF-WAY AND THE LANE CHANGE COST
616

CONTROL THE VEHICLE BASED ON THE MODIFIED LANE CHANGE COST
618

FIG. 6

LANE CHANGING BASED ON A LANE CHANGE RIGHT-OF-WAY COST

BACKGROUND

Vehicles, such as autonomous vehicles, may navigate along designated routes. In some examples, an autonomous vehicle may encounter various dynamic objects navigating in the same or in an adjacent lane as that of the vehicle. Upon detecting the object(s), the autonomous vehicle may determine whether to stay in the current lane or perform a lane changing maneuver. However, in certain situations, techniques for evaluating lane changing driving maneuvers (or trajectories) may result in the selection of suboptimal trajectories to follow through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates an example computing system including a planning component configured to determine (or select) candidate trajectories for a vehicle to follow based on a lane changing cost, in accordance with one or more examples of the disclosure.

FIG. 6 is a flow diagram illustrating an example process for generating a candidate trajectory that changes driving lanes to a target driving lane, identify relevant object(s) in the target driving lane, determine a lane change cost associated with the candidate trajectory based on the object(s), and control the vehicle based on the lane change cost, in accordance with one or more examples of the disclosure.

DETAILED DESCRIPTION

Figure 1:
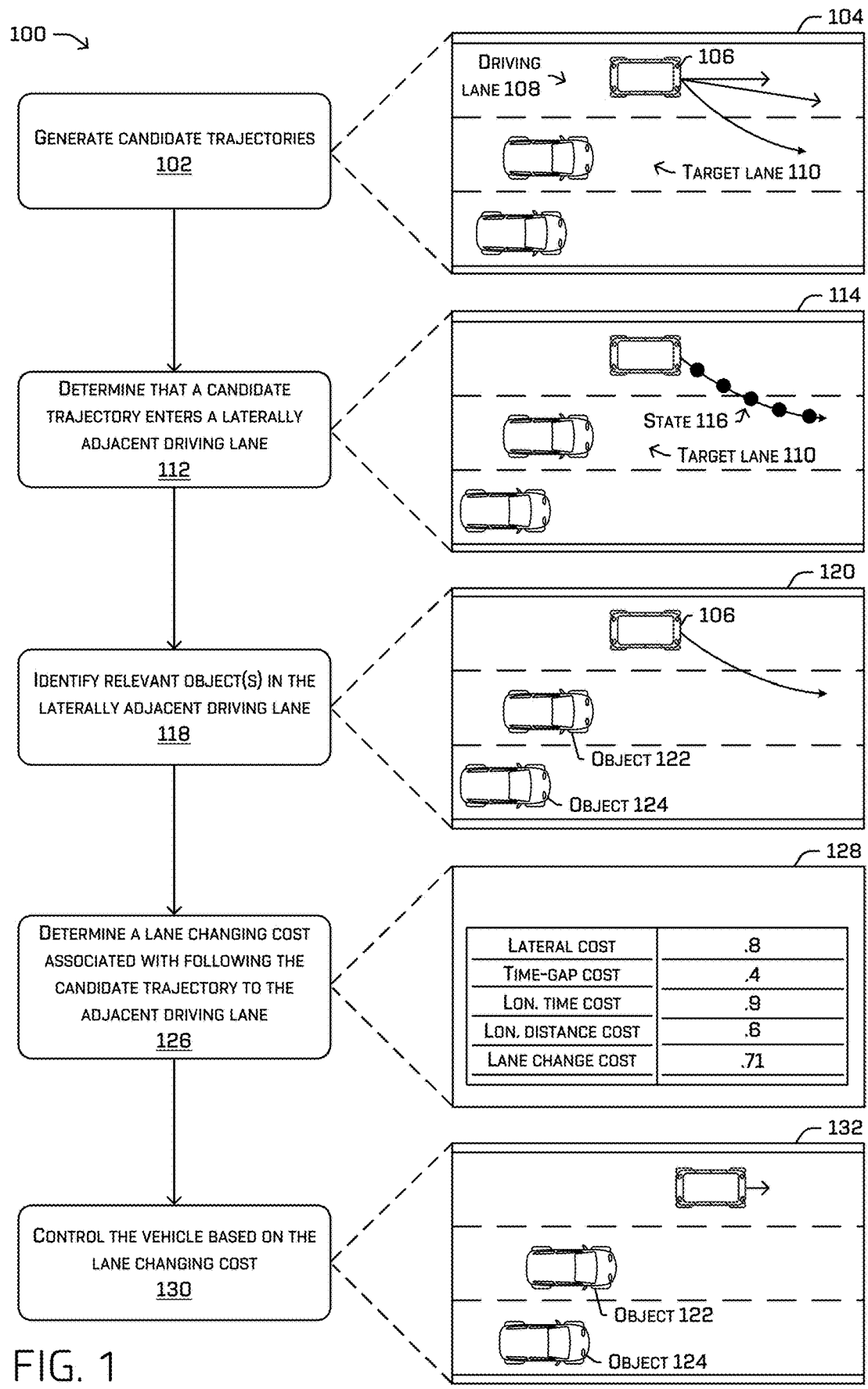
FIG. 1 is a pictorial flow diagram illustrating an example technique for performing a lane change based on a lane change right-of-way cost, in accordance with one or more examples of the disclosure.

Techniques for evaluating lane changing candidate trajectories are described herein. In some examples, a vehicle (such as an autonomous vehicle) may generate (or receive) one or more candidate trajectories to follow within an environment. In some cases, one or more of the candidate trajectories may be lane changing trajectories (e.g., those trajectories in which the vehicle departs from a lane in which it is currently driving). As such, the vehicle may determine a lane-based cost (e.g., lane changing cost, merging cost, unprotected turning cost; collectively referred to herein as "lane changing cost") associated with following the lane changing candidate trajectories such as to evaluate the degree to which the candidate trajectory respects the right-of-way (hereinafter referred to as ROW) of the object(s) located in the target lane. Accordingly, when generating the lane changing cost, the vehicle may determine that an object is located within the target lane. Based on the object being longitudinally behind the vehicle, the vehicle may determine one or more sub-costs that may be combined into the lane changing cost. The vehicle may associate the lane change cost to the corresponding candidate trajectory and select (or determine) to follow the candidate trajectory based on the cost value. As described in more detail below, the techniques described herein may improve vehicle safety and driving efficiency by increasing the ability of the vehicle to determine cost values that accurately represent the cost for following a trajectory into a laterally adjacent driving lane, thereby allowing the vehicle to perform safter and more efficient driving maneuvers.

Further, though described herein as a cost associated with the trajectory, such a description is not meant to be so limiting and is used for ease of explanation. It would be understood that the costs described herein may be associated with any portion of a trajectory as it is being generated (e.g., when exploring a tree) for those portions associated with a "lane change" or change in lane identifiers. As a non-limiting example of which, a trajectory associated with a fixed number of nodes may have such costs associated with it unless a change in lane identifier is associated with a node and then for all subsequent nodes and/or those subsequent nodes associated with a lane change (change of lane identifier).

When performing lane change maneuvers, it may be beneficial to ensure that the vehicle respects the ROW of the object(s) located in the target lane (e.g., the driving lane to which the vehicle is to navigate). For example, a vehicle may generate one or more candidate trajectories to follow to a destination. In some instances, some of the candidate trajectories may instruct the vehicle to change driving lanes to a laterally adjacent driving lane. When evaluating such candidate trajectories, the vehicle may predict where the object(s) in the adjacent driving lane may be located at future times and generate costs to associate with the candidate trajectories based on such information. In some cases, the vehicle may determine that the cost(s) indicate that the vehicle is able to safely navigate into the target driving lane without interacting (or colliding) with the object(s) in the target lane and as such, the vehicle may maneuver into the target lane. However, in some circumstances, when performing the lane change, the vehicle may get too close (laterally and/or longitudinally) to the object(s) in the target lane resulting in the vehicle violating the object(s) ROW. That is, in some instances, the object may be biased towards the side of a wide driving lane which may make the vehicle believe that the vehicle may transition into the driving lane without interacting with the object. However, transitioning to the target driving lane may result in potential interactions between the object and the vehicle. Further, such a maneuver may result in causing the object to perform unpredictable maneuvers (in an attempt to avoid a collision) in response to noticing the vehicle entering the target lane. As such, the systems and/or techniques described herein may enable the vehicle to perform lane changing maneuvers without violating the ROW of the object(s) in the target lane.

To address these and other technical problems and inefficiencies, the systems and/or techniques described herein include a planning component (which also may be referred to as a "planning system" or "planner component") configured to enable vehicles to navigate into laterally adjacent driving lanes without violating the ROW of other object(s) located in the adjacent lane. Technical solutions discussed herein solve one or more technical problems associated with conventional techniques resulting in suboptimal driving maneuvers.

In some examples, the planning component may generate one or more candidate trajectories. The planning component may generate, select, and/or follow multiple candidate trajectories through the environment. In some instances, the candidate trajectories may include instructions that instruct the vehicle how to navigate a portion of the environment. The candidate trajectories can include instructions that cause the vehicle to perform various types of actions, such as remain in the same lane, lane change left, lane change right, pass an object proximate the vehicle, modify vehicle kinematics (e.g., velocity, acceleration, etc.), and/or any other type of action. In some examples, a candidate trajectory may include multiple predicted states that can represent the state information of the vehicle at a specific location along the candidate trajectory. State information may include location data, pose data (e.g., lateral offset data, longitudinal offset data, heading offset data), velocity data, acceleration data, and/or other types of data. Examples of various techniques for generating planner trajectories for autonomous vehicles can be found, for example, in U.S. Pat. No. 10,921,811, filed on Jan. 22, 2018, issued on Feb. 16, 2021, and titled, "Adaptive Autonomous Vehicle Planner Logic," in U.S. patent application Ser. No. 18/540,642, filed Dec. 14, 2023, and titled "Machine-Learned Cost Estimation in Tree Search Trajectory Generation for Vehicle Control," in U.S. Pat. No. 11,875,678, filed on Jan. 21, 2021 and issued on Jan. 16, 2024, and titled "Unstructured Vehicle Path Planner," and in U.S. Pat. No. 10,955,851, filed on Feb. 14, 2018, issued on Mar. 23, 2021, and titled, "Detecting Blocking Objects," each of which is incorporated by reference herein in its entirety.

In some examples, the planning component may determine that a candidate trajectory overlaps with and/or enters into a laterally adjacent driving lane (e.g., by crossing a lane boundary). That is, the planning component may evaluate the state data of the candidate trajectories to determine whether such candidate trajectories are lane change trajectories. For example, the planning component may receive map data which may represent and/or include one or more static features within the environment. Map data may include information (e.g., static information) about the environment such as road segment data, driving lane data, lane segment data, etc. Based on receiving the map data, the vehicle may identify a driving lane within which the vehicle is located (e.g., based on vehicle position data) and determine whether one or more of states of a candidate trajectory are located in and/or is associated with a laterally adjacent driving lane. For instance, the planning component may project the states of the candidate trajectory into the map data and determine that a position of a state is located within or is otherwise associated with an adjacent driving lane. In other examples, the planning component may determine the candidate trajectory changes lanes (e.g., lane change, merge, unprotected turn, etc.) based on determining that the candidate trajectory has crossed or otherwise intersected a lane marker and/or if the candidate trajectory intersects a driving lane with a different driving lane identifier as the driving lane within which the vehicle is located. As such, the planning component may determine that one or more of the candidate trajectories enter a driving lane adjacent to that of the vehicle.

In some examples, the planning component may identify relevant object(s) in the adjacent driving lane(s) (e.g., or target lane(s)). That is, the vehicle may include one or more sensor devices (e.g., lidar device(s), radar device(s), image capturing device(s), time-of-flight device(s), infrared device (s), etc.) located and/or mounted at various locations and/or angles in and/or on the vehicle. In such cases, the vehicle may receive sensor data for the sensor(s) and analyze such data to detect an object within the environment. Based on identifying object(s) within the environment, the vehicle may determine whether such objects are relevant to the vehicle. Techniques for identifying relevant objects may be found, for example, in U.S. patent application Ser. No. 18/132,289 entitled "Machine-Learned Model for Detecting Object Relevance to Vehicle Operation Planning" filed on Apr. 7, 2023, in U.S. patent application Ser. No. 18/394,908 entitled "Identifying Relevant Objects Based on Artificial Paths" filed Dec. 22, 2023, and in U.S. patent Ser. No. 17/854,269 entitled "Identifying Relevant Objects Within an Environment," filed on Jun. 30, 2022, the entire contents of each are hereby incorporated by reference herein for all purposes.

Accordingly, the vehicle may analyze the one or more relevant object(s) to determine whether one or more of the objects are located within the target driving lane (e.g., a laterally adjacent driving lane to which a candidate trajectory enters). The vehicle may determine that a relevant object is in (or otherwise occupies) the target driving lane based on identifying a location of the object and determining that the location of the object overlaps with the location of the target driving lane. As such, the planning component may identify one or more relevant object(s) that occupy the one or more target driving lane(s).

In some examples, the planning component may determine that the vehicle is in front of the relevant object. That is, if the vehicle is behind the relevant object, changing lanes behind relevant object may likely not violate the ROW of the relevant object. In such cases, if the vehicle is behind the relevant object, the planning component may refrain from generating the lane changing cost (or the lane-based cost). Rather, changing lanes in front of the relevant object is more likely to violate the ROW of the relevant object. As such, the planning component may determine whether the vehicle Is longitudinally in front of the relevant object. The planning component may determine that the vehicle is longitudinally in front of the object based on comparing the position data of the vehicle and the object with the driving lane data. In other examples, the planning component may determine a score (based on comparing position data of the object and vehicle) that indicates the degree to which the vehicle is in front of the object. In such cases, if the score meets or exceeds a threshold, the planning component may determine that the vehicle is in front of the object. Accordingly, the planning component may determine that the vehicle is in front of object.

Further, the planning component may determine whether the object has established itself within the target driving lane. That is, the planning component may generate a ROW score that indicates the degree to which the object has established itself within the target driving lane (e.g., or the degree of ROW the object has in the target driving lane). As non-limiting examples of such, the establishment score may be based at least in part on one or more of how long the vehicle has been in the lane, whether the vehicle is performing a lane-change operation, policy-related determinations related to whether the vehicle is allowed to be in the lane (e.g., a singly occupied vehicle entering into a high occupancy lane), or otherwise. In such cases, the planning component may compare the ROW score with a threshold to determine whether the object is sufficiently established within the target driving lane. That is, if the ROW meets or exceeds a threshold, the planning component may determine that the object has sufficiently established itself in the target driving lane and as such, the planning component may proceed to generate lane changing cost(s) based on the candidate trajectories that enter the target driving lane.

Based on the vehicle being in front of the relevant object(s) and the object having established itself in the target driving lane, the planning component may evaluate the candidate trajectories to determine whether the trajectories violate the ROW of the relevant object(s). That is, the planning component may input the candidate trajectories into a tree structure and determine various types of costs, one of which being a cost the measures the cost of performing the lane change maneuver relative to the relevant object.

Accordingly, the planning component may generate a tree structure that includes some or all of the candidate trajectories. A tree structure may include one or more nodes representing vehicle states at different action layers of the tree structure. Further, each vehicle state may include the multiple candidate trajectories which the vehicle may follow (as described above). As described in more detail below, the planning component may use the tree structure to determine or otherwise select one or more of the candidate trajectories to follow within the environment. Example techniques for generating a tree structure and determining a control trajectory based on the tree structure can be found, for example, in U.S. application Ser. No. 17/900,658, filed Aug. 21, 2022, and titled "Trajectory Prediction Based on a Decision Tree," the contents of which is herein incorporated by reference in its entirety and for all purposes.

In some examples, the vehicle can determine a control trajectory based on the tree structure. The vehicle can evaluate some or all candidate trajectories at each node when determining a control trajectory. That is, the planning component may determine and/or evaluate cost values at some or all layers or nodes of the tree search (or at some or all states of the candidate trajectory). A solution to the tree may result in a series of nodes of the one or more candidate trajectories which, when traversed (e.g., moving along and between differing trajectories), results in an output trajectory (e.g., control trajectory) having a lowest determined overall cost. An overall cost for the output trajectory may represent and/or be indicative of the combination of one or more sub-costs. A cost value can indicate the safety, risk, convenience, and/or efficiency of a candidate trajectory. For instance, a high cost value may indicate heightened degree of risk, danger, inconvenience, and/or inefficiency of the trajectory. In contrast, a low cost value may indicate a lower degree of risk, danger, inconvenience, and/or inefficiency of the trajectory. In some examples, sub-costs may include comfort related costs (e.g., acceleration cost, jerk cost, steering cost, path reference cost, etc.), legality related costs, policy related costs, safety related costs (e.g., lane changing costs), progress costs, debris cost, a lane blocking cost, a lane ending cost, an exit cost, an approach cost, a space cost, a payment cost, a yaw cost, lane targeting cost (e.g., cost associated with the vehicle being located in a desired lane), and/or any other type of cost.

When determining lane changing cost, the planning component may determine one or more sub-costs that may be used to generate the lane changing cost. The lane changing cost may represent the degree to which the vehicle violates the ROW of the object(s) in the target lane. Further, the lane changing cost may be a combination of one or more sub-costs. The sub-costs may include, for example, a time-gap cost, a longitudinal time-to-collision (or longitudinal TTC), a distance-based cost, a lateral TTC, a deceleration cost, and/or any other type of cost. In such examples, the planning component may determine a separate cost value for one or more of the sub-costs and combine such cost value(s) into a single cost value which may represent the lane changing cost. Additional description about the sub-costs may be discussed below.

For example, the planning component may determine a time-gap sub-cost that determines whether the object has a sufficient time-gap to react. In some examples, the planning component may determine a longitudinal distance between the vehicle and the object. The longitudinal distance may be measured from a rear bumper of the vehicle and a front bumper of the object. Further, the planning component may determine (or predict) a trajectory of the object and analyze the trajectory to determine an object velocity. In some examples, the longitudinal distance and the object velocity may be measured at a simulation (or simulated) time associated with the front corner (or front portion) of the vehicle is predicted to enter the target driving lane. Accordingly, the planning component may determine how long it may take the object to travel the longitudinal distance based on the object velocity. The formula for determining the time-gap sub-cost may be:

$$\text{Time}-\text{Gap} = \text{Longitudinal Distance/Object Velocity} \quad \text{Equation 1}$$

In this equation, Time-Gap may represent a period of time that it is predicted the object to take to travel the Longitudinal Distance. In some examples, the planning component may determine, based on the period of time, a time-gap sub-cost. That is, the time-gap sub-cost may be a value between zero and one, where zero represents a safe cost in the longitudinal direction. In this example, the time-gap sub-cost may be one if the Time-Gap is less than or equal to 0.8 seconds and zero if the period of time is greater than or equal to two seconds. The time-gap sub-score may be between zero and one if the Time-Gap is between 0.8 seconds and two seconds. However, these time values are not intended to be limiting; in other examples, the time values may be higher or lower.

Additionally or alternatively, the planning component may determine a longitudinal TTC which may represent a longitudinal time to contact between the vehicle and the object. For example, the planning component may determine a longitudinal distance between the vehicle and the object measured from a rear bumper of the vehicle and the front bumper of the object. Further, the planning component may use the object velocity to determine a relative velocity between the vehicle and the object. In some examples, the longitudinal distance and the relative velocity may be measured at the moment when the front corner (or front portion) of the vehicle is predicted to enter the target driving lane. The planning component may determine how long it may take the object to travel the longitudinal distance based on the relative velocity. The formula for determining the longitudinal TTC sub-cost may be:

$$\text{Longitudinal } TTC = \text{Longitudinal Distance/Relative velocity} \quad \text{Equation 2}$$

In this equation, Longitudinal TTC may represent a period of time that it is predicted for the object to travel the Longitudinal Distance. In some examples, the planning component may determine, based on the period of time, a longitudinal TTC sub-cost. That is, the longitudinal TTC sub-cost may be a value between zero and one, where zero represents a safe cost in the longitudinal direction. In this example, the longitudinal TTC sub-cost may be one if the Longitudinal TTC is less than or equal to two seconds and zero if the Longitudinal TTC is greater than or equal to three seconds. The longitudinal TTC sub-score may be between zero and one if the Longitudinal TTC is between two seconds and three seconds. However, these time values are not intended to be limiting; in other examples, the time values may be higher or lower.

Additionally or alternatively, the planning component may determine a distance-based sub-cost that may be based on the acceleration of the vehicle and the object. For example, the planning component may determine a relative velocity (e.g., straight line velocity) between the vehicle and the object and/or a relative acceleration between the vehicle and the object. In such cases, the planning component may receive (or determine) an acceptable time-gap and use the time-gap with the relative velocity and the relative acceleration to determine a modified relative velocity. Based on the determining the modified relative velocity, the planning component may determine a modified distance value based on the following formula:

$$\text{Modified Distance} = \qquad\qquad \text{Equation 3}$$
$$\text{Modified Relative Velocity} * \text{Time-Gap} +$$
$$\text{Longitudinal Distance}$$

In this equation, Modified Distance may be a distance value that represents a longitudinal distance between the vehicle and the object that has been modified to account for the acceleration of the vehicle and object. In some examples, the planning component may determine, based on the Modified Distance, a distance sub-cost. That is, the distance sub-cost may be a value between zero and one, where zero represents a safe cost in the longitudinal direction. In this example, the distance sub-cost may be one if the Modified Distance is less than or equal to 10 meters and zero if the Modified Distance is greater than or equal to 20 meters. The distance sub-score may be between zero and one if the Modified Distance is between 10 meters and 20 meters. However, these distances are not intended to be limiting; in other examples, the distances may be higher or lower.

Additionally or alternatively, the planning component may determine a lateral TTC sub-cost which may represent a lateral time to contact between the vehicle and the object. For example, the planning component may determine a lateral distance between the vehicle and the object measured from a side of the object closest to the vehicle and the lane marker (or marking) on the road surface that divides the driving lanes. The lateral distance may represent a distance the vehicle has to travel in the lateral direction beyond the lane marker to collide with the object. Further, the planning component may evaluate the candidate trajectory and determine a period of time it may take to travel the lateral distance based on a lateral component of the candidate trajectory. In some examples, the lateral distance may be measured at the moment when the front corner (or front portion) of the vehicle is predicted to enter the target driving lane. In some examples, the planning component may determine, based on the period of time, a lateral TTC sub-cost. That is, the lateral TTC sub-cost may be a value between zero and one, where zero represents a safe cost in the lateral direction. In this example, the lateral TTC sub-cost may be one if the time to contact (or the period of time) is less than or equal to 1.5 seconds and zero if the period of time is greater than or equal to three seconds. The longitudinal TTC sub-score may be between zero and one if the period of time is between 1.5 seconds and three seconds. However, these time values are not intended to be limiting; in other examples, the time values may be higher or lower.

Additionally or alternatively, the planning component may determine a deceleration sub-cost which may represent a level of deceleration to be performed by the object to avoid a collision with the vehicle. That is, at the moment at which the vehicle is predicted to cross the lane marker separating the driving lanes, the planning component may determine an object velocity, a vehicle velocity, and a longitudinal distance between the vehicle and the object. In such examples, the planning component may determine a relative velocity based on the vehicle velocity and the object velocity. Further, the planning component may determine a modified distance value based on the longitudinal distance, the relative velocity, and a reaction time of the object (e.g., 1.5 seconds, 2 seconds, etc.). In some examples, the planning component may determine the acceleration needed for the object to avoid a collision with the vehicle based on the vehicle maintaining a constant velocity. The deceleration sub-cost may be determined based on the following formula:

$$\text{Acceleration} = (\text{Relative Velocity})^2/(2 * \text{Modified Distance}) \quad \text{Equation 4}$$

In this equation, Acceleration may represent an acceleration value that the object would need to perform to avoid a collision with the vehicle. In some examples, the planning component may determine, based on the Acceleration, a deceleration sub-cost. That is, the deceleration sub-cost may be a value between zero and one, where zero represents a safe deceleration cost. In this example, the deceleration sub-cost may be one if the Acceleration is greater than or equal to $-10$ m/s$^2$ and zero if the period of time is less than or equal to $-4$ m/s$^2$. The deceleration sub-score may be between zero and one if the Acceleration is between $-10$ m/s$^2$ and $-4$ m/s$^2$. However, these acceleration values are not intended to be limiting; in other examples, the acceleration values may be higher or lower.

Based on determining the one or more sub-costs described above, the planning component may combine the sub-costs into a single lane changing cost. In various examples, differing sub-cost types may be associated with differing weights based on, for example, importance. Additionally or alternatively, the planning component may determine a modified lane changing cost by combining a ROW score (or metric) of the object with the lane changing cost. That is, the planning component may receive or otherwise determine a ROW score of the object in the target lane. The ROW score may represent an amount of ROW the object has in the target driving lane. Techniques for determining a ROW may be found, for example, in U.S. patent application Ser. No. 17/850,348 titled "Determining Right of Way," filed on Jun. 27, 2022, the entire contents are hereby incorporated by reference herein for all purposes. Accordingly, the planning component may scale the lane changing cost by multiplying the ROW score with the lane changing cost. In such cases, the planning component may use the modified lane changing cost in the tree structure.

Upon determining the lane changing cost (or the modified lane changing cost) and the one or more other sub-costs, the planning component may determine or otherwise combine the sub-costs into a single overall cost. In various examples, differing cost types may be associated with differing weights based on, for example, importance. As a non-limiting examples, a safety cost may be associated with a higher weight than a comfort cost. Further, such costs may be weighted differently, and as such, different costs may affect the overall cost in different proportions. In some examples, the vehicle may determine to follow a control trajectory that has the lowest overall cost compared to the overall costs of other potential traversal paths between the candidate trajectories.

In some examples, the vehicle may follow the control trajectory while operating within the environment. Upon determining the control trajectory from the tree search, the vehicle may follow the control trajectory throughout the environment.

Though the lane changing cost has been described with respect to a candidate trajectory that includes a lateral lane changing maneuver, in other examples, the techniques described throughout may be applied to merging scenarios, unprotected turning scenarios, and/or any other situation in which a driving lane identifier changes within map data over the course of a trajectory. That is, as an example, the planning component may determine that a candidate trajectory instructs the vehicle to perform a merging maneuver (e.g., where two driving lanes merge into a single driving lane). In such cases, the planning component may perform the techniques described above (e.g., determine relevancy of the object, determine whether the object is established in its lane, determine whether the vehicle is in front of the object, etc.) to determine a lane-based cost to associate with the candidate trajectory.

The techniques described herein can improve the functioning, safety, and efficiency of the autonomous and semi-autonomous vehicles operating in various driving environments. Determining a lane changing cost based on various sub-costs may enable the vehicle to receive an accurate understanding regarding whether the vehicle is predicted to violate the ROW of an object in a laterally adjacent driving lane. That is, by including the abovementioned lane changing cost, the vehicle may decrease the likelihood of potential collisions during lane changing scenarios and increase the ability of the vehicle to respect the ROW of the object(s) proximate the vehicle.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for performing a lane change based on a lane change right-of-way cost. As shown in this example, some or all of the operations in the example process 100 may be performed by a perception component, prediction component, a planning component, and/or any other component or systems within an autonomous vehicle. As described below in more detail, the planning component may include various components, such as a trajectory generating component, a target lane identifying component, a ROW determining component, a trajectory cost component, and/or a trajectory determining component.

At operation 102, the planning component may generate candidate trajectories. In some examples, a vehicle may navigate an environment from a starting location to an ending location. While traversing the environment, the vehicle may generate one or more candidate trajectories that the vehicle may evaluate when determining how to proceed. For example, box 104 illustrates a vehicle generating multiple candidate trajectories. In this example, the box 104 may include a vehicle 106 navigating in a driving lane 108. As shown, the vehicle 106 may generate multiple different candidate trajectories that instruct the vehicle 106 to navigate the environment in unique ways. For instance, the vehicle 106 may include a candidate trajectory that instructs the vehicle 106 to proceed straight in the driving lane 108. Further, the vehicle 106 may include a candidate trajectory that instructs the vehicle 106 to bias towards a side of the driving lane 108. The vehicle 106 may also include a candidate trajectory that instructs the vehicle 106 to change lanes from the driving lane 108 to the target driving lane 110. Of course, this example is not intended to be limiting; in other examples, the vehicle 106 may include more or fewer candidate trajectories that instruct the vehicle to perform similar or different driving maneuvers.

At operation 112, the planning component may determine that a candidate trajectory enters a laterally adjacent driving lane. In some examples, the candidate trajectories generated at operation 102 may instruct the vehicle 106 to perform various different operations, such as to change driving lanes. In these instances, the planning component may determine whether a candidate trajectory is a lane change trajectory by determining whether a state of the candidate trajectory overlaps with or enters a region of the environment covered (or otherwise associated with) a laterally adjacent driving lane. In other examples, the planning component may determine the candidate trajectory changes lanes (e.g., lane change, merge, unprotected turn, etc.) based on determining that the candidate trajectory has crossed or otherwise intersected a lane marker and/or if the candidate trajectory intersects a driving lane with a different driving lane identifier as the driving lane within which the vehicle is located. For example, box 114 illustrates determining whether a candidate trajectory is a lane change trajectory. In this example, the planning component has identified one or more states 116 of the candidate trajectory. As described above, the states 116 may include data such as position data, vehicle heading data, vehicle velocity data, etc. According, the planning component may analyze the position data associated with the states 116 to determine whether the locations of such states 116 overlap with one or more of the laterally adjacent driving lanes, as indicated in map data. In this example, one or more of the states 116 are in the target driving lane 110 and as such, the candidate trajectory may be a lane changing candidate trajectory.

At operation 118, the planning component may identify relevant object(s) in the target driving lane 110. In some examples, the vehicle 106 may include one or more sensor device(s) (e.g., lidar device(s), radar device(s), time-of-flight device(s), image capturing device(s), etc.) configured to capture sensor data associated with the environment proximate the vehicle 106. The vehicle 106 may analyze such sensor data to detect one or more objects in the environment. For example, box 120 illustrates detecting multiple object(s) proximate the vehicle 106. In this example, the vehicle 106 may identify the object 122 and the object 124. As shown, the object 122 and the object 124 may be vehicles; however, in other examples the object(s) may be any other type of dynamic object. In some examples, the vehicle 106 may input the data associated with these objects into a relevance filtering system which may indicate that the object 122 and the object 124 are relevant to the safe, effective, and/or efficient navigation of the vehicle 106. Based on identifying that both objects are relevant, the planning component may determine whether either of the objects are located in the target driving lane 110. In such cases, the planning component may compare the position data of the objects to the positions and/or regions of the environment covered by the target driving lane 110 and determine whether such object(s) overlap with the target driving lane 110. In this example, the object 122 may be located in the target driving lane 110 and the object 124 may not be located in the target driving lane 110. As such, the planning component may perform various lane changing cost determination operations with respect to the object 122.

At operation 126, the planning component may determine a lane changing cost associated with following the candidate trajectory to the target driving lane 110. As described above, generating the lane changing cost may be based on determining that the vehicle is in front of the object (e.g., a score indicating a degree of being in front of the object meets or exceeds a threshold) and/or determining that the object has established itself (e.g., ROW score of the object meets or exceeds a threshold level) within the target driving lane 110. If such scores do not meet or exceed some threshold level, additional processing may not be required. In some examples, the planning component may generate one or more sub-costs associated with candidate trajectory. One of the sub-costs may be a lane changing cost that indicates the degree to which the vehicle 106 respects (or alternatively, violates) the ROW of the object(s) in the target driving lane. When determining the lane changing cost, the planning component may determine one or more sub-costs that combined to be the lane changing cost. For example, box 128 illustrates the various sub-costs as well as the lane change cost. In this example, the box 128 includes a lateral cost (or lateral TTC) sub-cost which may be 0.8, a time-gap sub-cost which may be 0.4, a longitudinal time (or longitudinal TTC) sub-cost which may be 0.9, a longitudinal distance sub-cost which may be 0.6, and/or an overall lane changing cost which may be 0.71. As noted above, the overall lane changing cost may be a result of combining the four sub-costs included in box 128. Of course, this example is not intended to be limiting; in other examples, the planning component may determine more or fewer sub-costs with differing cost values. Additional description regarding the generating of such sub-costs may be found in the description above and in FIG. 2.

At operation 130, the planning component may control the vehicle based on the lane changing cost. That is, the planning component may include the lane changing cost into an overall cost value associated with following the candidate trajectory. In this example and as shown in box 132, the vehicle 106 may determine to follow the candidate trajectory that instructed the vehicle 106 to continue straight. When evaluating the cost values, the vehicle 106 may determine that the cost associated with following the straight candidate trajectory was better (or lower) than the overall cost of performing the lane change maneuver to the target driving lane 110. As such, the vehicle 106 may proceed according to the straight candidate trajectory.

FIG. 2 illustrates an example computing system 200 including a planning component 202 configured to determine (or select) candidate trajectories for a vehicle to follow based on a lane changing cost.

In some examples, the planning component 202 may be similar or identical to the planning component described above, or in any other examples herein. As noted above, in some cases the planning component 202 may be implemented within an autonomous vehicle. In some examples, the planning component 202 may include various components, described below, configured to perform different functionalities of a technique to determine lane changing cost(s) which may be used to determine actions for vehicle to perform. In some examples, the planning component 202 may include a trajectory generating component 204 configured to generate one or more candidate trajectories throughout the environment, a target lane identifying component 206 configured to identify one or more relevant objects in a target driving lane, an ROW component 208 configured to determine an amount of ROW that an object has within a driving lane, a trajectory cost component 210 configured to generate a cost associated with following a candidate trajectory, and/or a trajectory determining component 212 configured to determine a trajectory for the vehicle to follow through the environment.

In some examples, the planning component 202 may include a trajectory generating component 204 configured to generate one or more candidate trajectories throughout the environment. The trajectory generating component 204 may receive sensor data indicative of the current driving scenario. The trajectory generating component 204 may use such sensor data to generate candidate trajectories through the environment. Examples of various techniques for generating planner trajectories for autonomous vehicles can be found, for example, in U.S. Pat. No. 10,921,811, filed on Jan. 22, 2018, issued on Feb. 16, 2021, and titled, "Adaptive Autonomous Vehicle Planner Logic," and U.S. Pat. No. 10,955,851, filed on Feb. 14, 2018, issued on Mar. 23, 2021, and titled, "Detecting Blocking Objects," the contents of each of which is incorporated by reference herein in its entirety. As shown, the trajectory generating component 204 may send candidate trajectory data to the target lane identifying component 206 and/or the trajectory cost component 210.

In some examples, the planning component 202 may include a target lane identifying component 206 configured to identify one or more relevant objects in a target driving lane. That is, the target lane identifying component 206 may be configured to identify or otherwise determine that a candidate trajectory is a lane changing trajectory that instructs the vehicle to navigate to a laterally adjacent driving lane (e.g., target driving lane). The target lane identifying component 206 may determine that the candidate trajectory enters or overlaps an adjacent driving lane based on one or more of the states of the candidate trajectory overlapping or otherwise being located within a region of the environment covered by the target driving lane. As such, upon identifying the target driving lane associated with the candidate trajectory, the target lane identifying component 206 may determine whether there are any relevant objects located in the target driving lane.

As shown in FIG. 2, the target lane identifying component 206 may receive one or more relevant object(s) 214 from one or more prediction and/or planning components. That is, the prediction and/or planning components may include a relevance filter system that identifies a subset of the object(s) proximate the vehicle that are relevant to the vehicle's safe travels. Accordingly, the relevant object(s) 214 may be static or dynamic object(s) that have been identified or tagged as objects that are relevant to the vehicle and to the safe progress of the vehicle. The relevant object(s) 214 may include data associated with one or more features of the object. Such features may include pose data (e.g., position and/or orientation), velocity data, acceleration data, steering angle data, type data, etc. As such, the target lane identifying component 206 may analyze the relevant object data to determine that the relevant object 214 is located in the target driving lane. As shown, the target lane identifying component 206 may send the data described herein to the ROW component 208 and/or the trajectory cost component 210.

In some examples, the planning component 202 may include a ROW component 208 configured to determine an amount of ROW that an object has within a driving lane. That is, the ROW component 208 may perform various operations to determine a degree or amount of ROW associated with (or corresponding to) the relevant object in the target driving lane. Techniques for determining a ROW may be found, for example, in U.S. patent application Ser. No. 17/850,348 titled "Determining Right of Way," filed on Jun. 27, 2022, the entire contents are hereby incorporated by reference herein for all purposes.

In some examples, the planning component 202 may include a trajectory cost component 210 configured to generate a cost associated with following a candidate trajectory. The trajectory cost component 210 may receive the candidate trajectories, the target driving lane, and/or ROW metrics or scores. In some examples, the trajectory cost component 210 may generate a tree structure that includes some or all of the candidate trajectories. The purpose of the tree structure is to enable the vehicle to evaluate the candidate trajectories at each state of the vehicle and to determine a control trajectory for the vehicle to follow based on such candidate trajectories. The tree structure may include an initial node (e.g., root node) which represents the state of the vehicle. Multiple candidate trajectories may extend from the initial node. In such instances, the trajectory cost component 210 may determine a traversal path based on the candidate trajectories that results in the traversal path having a lowest determined overall cost. To determine the lowest overall cost, the trajectory cost component 210 may determine one or more sub-costs that may be combined into the overall cost.

As shown, the trajectory cost component 210 may include the lane-based cost component 216 configured to generate (or determine) a lane-based cost associated with a candidate trajectory or a portion of a candidate trajectory. Specifically, the lane-based cost component 216 may determine a lane-based cost in lane changing scenarios, merging scenarios, unprotected turns, and/or any location in which an identifier of the driving lane changes. As noted above, the lane change cost may be the result of one or more sub-costs. That is, as shown, the lane-based cost component 216 may include a longitudinal sub-cost(s) component 218 and a lateral sub-cost(s) component 220. In this example, the sub-components of the lane-based cost component 216 may generate one or more sub-costs which may be combined to create the overall lane change cost. The longitudinal sub-cost(s) component 218 may determine a first longitudinal safety metric measuring the time-gap of a lane change, a second longitudinal safety metric measuring the longitudinal TTC, a third safety metric measuring a longitudinal distance between the relevant object and the vehicle based on acceleration values of the object and vehicle. The lateral sub-cost(s) component 220 may determine a lateral safety metric measuring the lateral TTC associated with the object and the vehicle. In some examples, the lane-based cost component 216 may combine the sub-costs generated by the longitudinal sub-cost(s) component 218 and the lateral sub-cost(s) component 220 into a single lane change cost. Upon generating the lane change cost, the lane-based cost component 216 may modify or scale the lane change cost by multiplying the ROW score with the lane change cost. In some instances, the trajectory determining component 212 may use the modified lane change cost when determining how to proceed through the environment.

In some examples, the planning component 202 may include a trajectory determining component 212 configured to determine a trajectory for the vehicle to follow through the environment. The trajectory determining component 212 may receive candidate trajectory data and/or the associated cost(s) from the trajectory cost component 210. In such instances, the trajectory determining component 212 may determine an overall cost based on combining the lane change cost (or the modified lane change cost) with the one or more other sub-costs (e.g., progress cost, lane ending cost, lane blocking cost, and/or any other cost) into a single overall cost. The vehicle may determine to follow a control trajectory that has the lowest overall cost compared to the overall costs of the other potential traversal paths between the candidate trajectories. The trajectory determining component 212 may send the trajectory 222 to the vehicle 224 for the vehicle 224 to follow. In such instances, upon receiving the trajectory 222, the vehicle 224 may be controlled, based on the instructions included in the trajectory 222, to follow the trajectory 222 throughout the environment.

Figure 3:
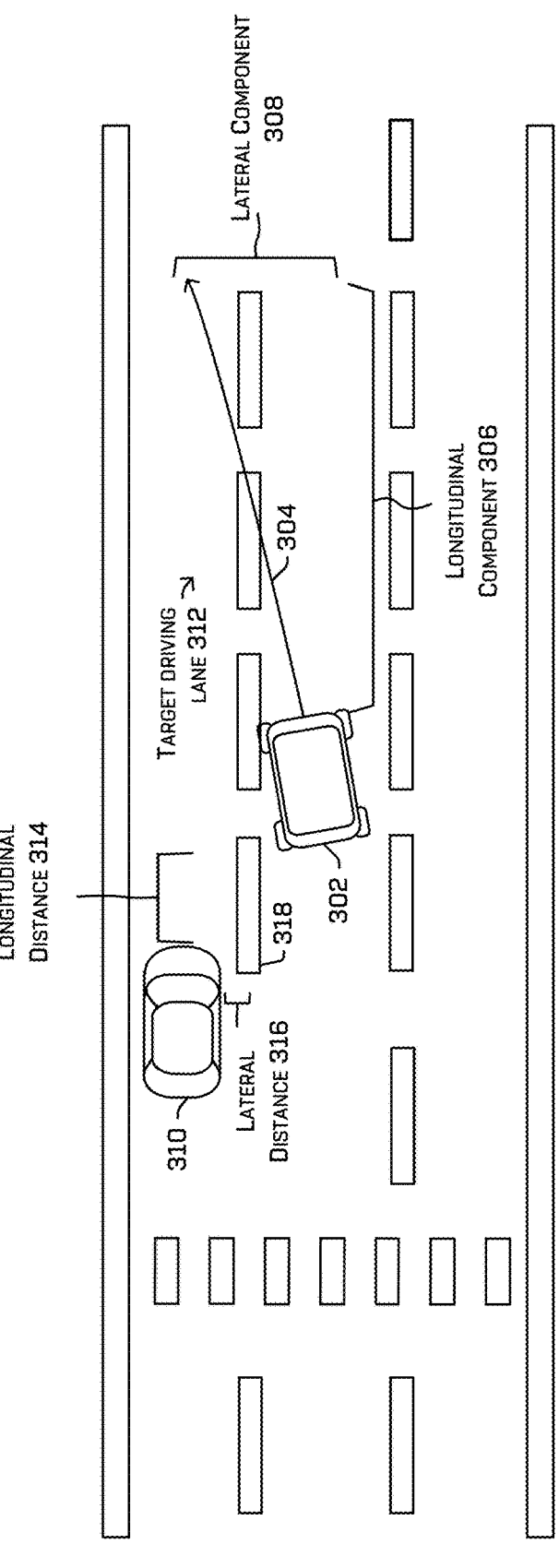
FIG. 3 depicts an example environment including a vehicle determining a lane change cost corresponding to a lane change candidate trajectory, in accordance with one or more examples of the disclosure.

FIG. 3 depicts an example environment 300 including a vehicle determining a lane change cost corresponding to a lane change candidate trajectory.

In this example, the example environment 300 may include a vehicle 302 which may include a candidate trajectory 304. The candidate trajectory may be a lane changing trajectory with a longitudinal component 306 and a lateral component 308. The longitudinal component 306 may be the length of the candidate trajectory 304 in the longitudinal direction with respect to the axis of the vehicle 302 extending from a front bumper of the vehicle 302. The lateral component 308 may be the length of the candidate trajectory 304 in the lateral direction with respect to the axis.

As described above, when determining the lane changing cost, the vehicle may identify an object, such as object 310. The object 310 may be a vehicle; however, in other examples, the object 310 may be any other type of dynamic object. As shown, the object 310 may be located in a driving lane that is laterally adjacent to that of the vehicle 302. That is, the object 310 may be located in the target driving lane 312. In this example, the vehicle 302 may be at a position that is longitudinally in front of the object 310.

When determining the lane change cost, the vehicle 302 may determine one or more sub-costs. When generating such sub-cost(s), the vehicle 302 may determine a longitudinal distance 314 between the vehicle and the object 310. Further, the vehicle 302 may determine a lateral distance 316 that extends from a side of the object 310 that is closest to the vehicle to a lane marker 318 that divides the driving lanes of the vehicle 302 and the object 310. As noted above, the planning component may determine the longitudinal distance 314 and/or the lateral distance 316 at a moment in which a portion of the vehicle 302 has intersected the lane marker 318. In some examples, the vehicle 302 may utilize the longitudinal component 306, the lateral component 308, the longitudinal distance 314, the lateral distance 316, and/or one or more vehicle 302 and/or object 310 kinematic values (e.g., velocity, acceleration, steering angle, etc.) when determining the one or more sub-scores. As noted above, the planning component may determine the lane changing cost (or the lane-based cost) and/or the associated sub-costs for some or all states (or nodes) that are located within the target driving lane 312. That is, when generating a control trajectory using the tree structure (or tree search), the planning component may determine the abovementioned distances and/or measurements for some or all nodes (or states) in the tree (e.g., states along the candidate trajectory 304 that are located within the target driving lane 312 and/or some or all states along the candidate trajectory 304 that are located along the candidate trajectory 304 after the vehicle 302 has intersected with the lane marker 318). In such cases, when determining the lane changing cost for future nodes, the planning component may determine such cost(s) based on a predicted location and/or state of the object. For example, if the planning component is determining a lane change cost for a state of the candidate trajectory 304 at four seconds in the future, the planning component may predict the state information of the object 310 at four seconds into the future and determine the measurement based on such information.

Figure 4:
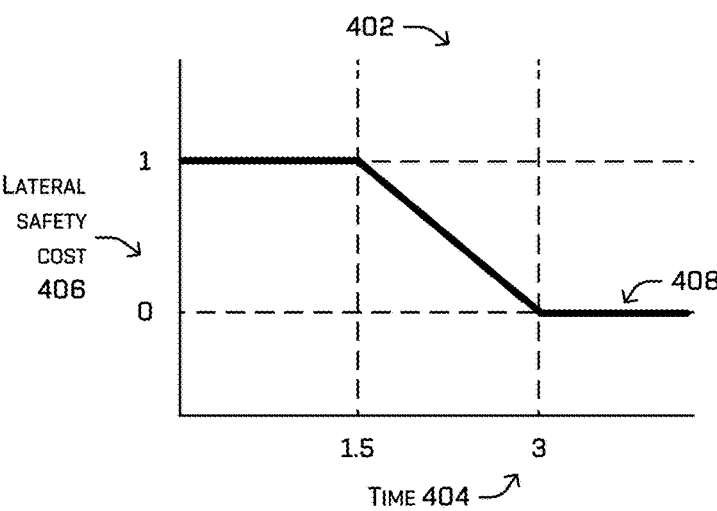
FIG. 4 depicts example graphs depicting a relationship between a period of time and a cost value, in accordance with one or more examples of the disclosure.
Figure 4:
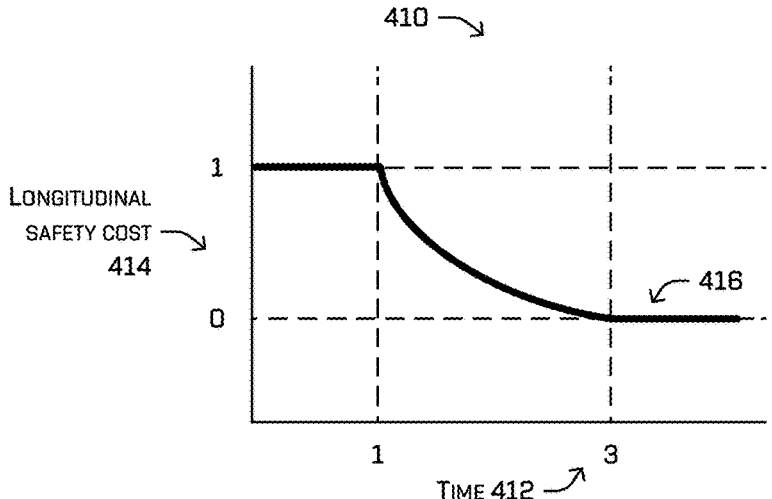

FIG. 4 depicts example graphs 400 depicting a relationship between a period of time and a cost value. Specifically, FIG. 4 illustrates determining sub-cost values based on time values.

As noted above, when determining the sub-cost(s), the planning components may determine various periods of time for the time-gap, the lateral TTC, the longitudinal TTC, the acceleration, etc. For example, the planning component may determine that the time-gap may be 3.7 seconds, the lateral TTC may be 1.0 seconds, etc. Based on determining such time values, the planning component may access or otherwise utilize the example graphs 400 to determine the associated cost. Of course, though noted as graphs, the description is not intended to be so limiting. It would be appreciated that a function (e.g., linear, non-linear (e.g., exponential or otherwise), or the like) may be used to determine the associated cost based on the relevant parameter.

In this example, FIG. 4 may include an example cost graph 402 which may be a graph or function that correlates time values to cost values. The cost graph 402 may correspond to the lateral TTC sub-cost. That is, the planning component may determine the time value for the lateral TTC and input the time to the cost graph 402 to determine the cost. As shown, the cost graph 402 may include an x-axis that is a time-based axis (e.g., time 404) and a y-axis that may be a cost-based axis (e.g., lateral safety cost 406). In this example, the cost graph 402 may include a line 408 which represents the lateral TTC cost based on the time 404. As shown by the line 408, the cost may be one if the time 404 is below 1.5 seconds, the cost may be between zero and one if the time 404 is between 1.5 seconds and 3 seconds, and the cost may be zero if the time 404 meets or exceeds three seconds. In this example, the cost between 1.5 seconds and three seconds may be linear. However, in other examples, the cost between 1.5 seconds and three seconds may be non-linear. As an example, if the lateral TTC time is 0.5 seconds, the planning component may determine that the cost is one. In other examples, if the lateral TTC time is 2.25 seconds, the planning component may determine that the cost is 0.5. Of course, this example is not intended to be limiting; in other examples, the time intervals and the cost values may differ.

As shown, FIG. 4 may also include a cost graph 410 which may be a graph that correlates time values to cost values. The cost graph 410 may correspond to the time-gap sub-cost. That is, the planning component may determine the time value for the time-gap and input the time to the cost graph 410 to determine the cost. As shown, the cost graph 410 may include an x-axis that is a time-based axis (e.g., time 412) and a y-axis that may be a cost-based axis (e.g., longitudinal safety cost 414). In this example, the cost graph 410 may include a line 416 which represents the time-gap cost based on the time 412. As shown by the line 416, the cost may be one if the time 412 is below 1 second, the cost may be between zero and one if the time 412 is between 1 second and 3 seconds, and the cost may be zero if the time 412 meets or exceeds three seconds. In this example, the cost between one second and three seconds may be non-linear. However, in other examples, the cost between one second and three seconds may be linear. As an example, if the time-gap time is 0.5 seconds, the planning component may determine that the cost is one. In other examples, if the time-gap time is 2 seconds, the planning component may determine that the cost is 0.75. Of course, this example is not intended to be limiting; in other examples, the time intervals and the cost values may differ.

Though FIG. 4 illustrates two separate cost functions (or graphs), the planning component may include a separate cost graph for some or all of the sub-costs. Further, in other examples, one or more of the sub-costs may use the same cost graph. Based on determining the sub-cost values, the planning component may combine such values into a single lane change cost which may be used to determine an overall cost value for the candidate trajectory.

Figure 5:
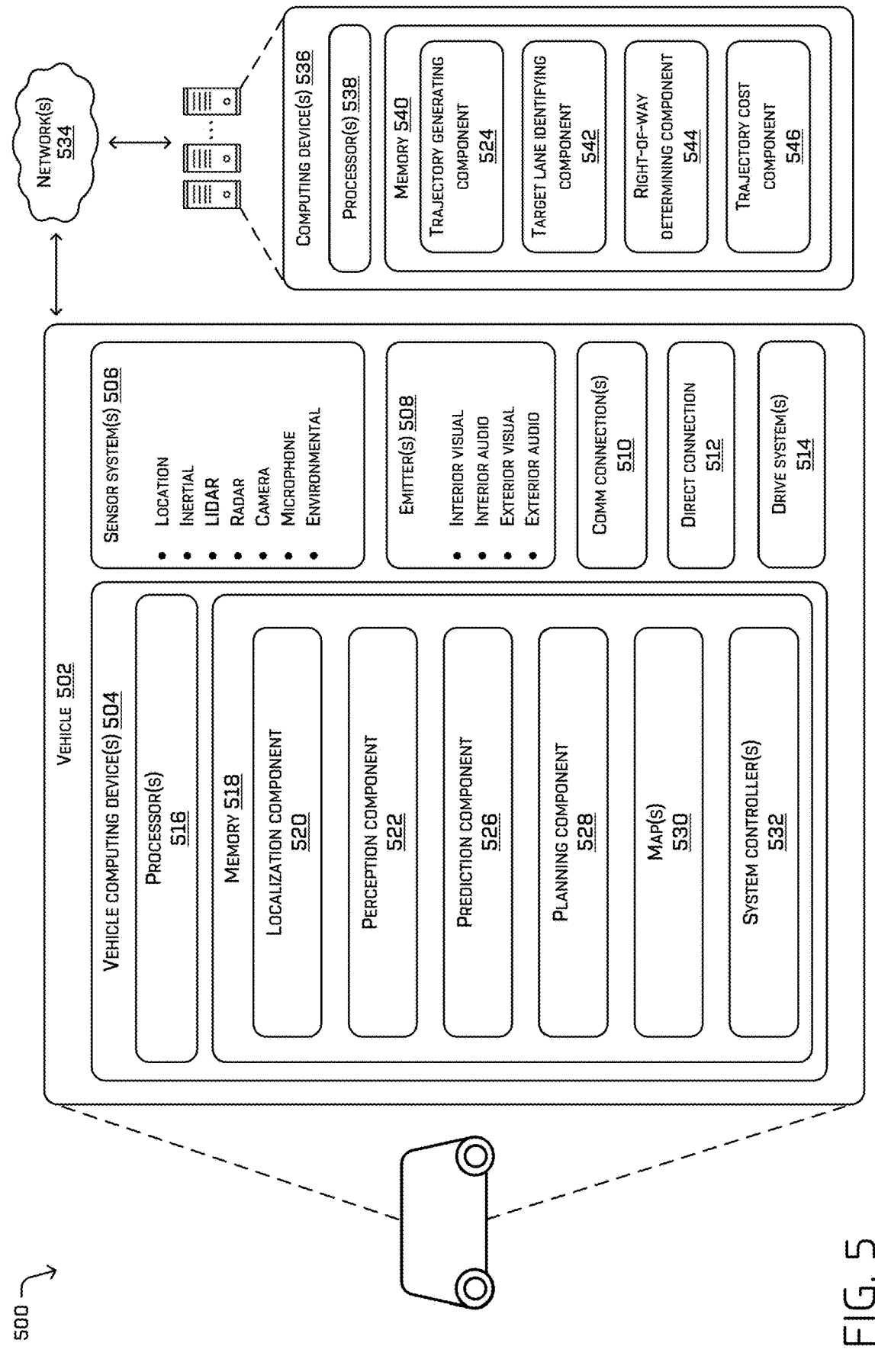
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a prediction component 526, a planner component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planner component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include a trajectory generating component 524, a target lane identifying component 542, a right-of-way determining component 544, and/or a trajectory cost component 546.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage. The planner component 528 may perform any of the techniques described with respect to any of FIGS. 1-4 above with respect to determining candidate trajectories to follow based on lane change cost values.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., sec U.S. patent application Ser. No. 15/963,833, which is incorporated by reference in its entirety herein for all purposes), and/or VoxelNet. Architecture latency optimizations may include Mobilenet V2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a trajectory generating component 524, a target lane identifying component 542, a right-of-way determining component 544, and/or a trajectory cost component 546. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the trajectory generating component 524, the target lane identifying component 542, the right-of-way determining component 544, and/or the trajectory cost component 546. may perform substantially similar functions as the planner component 528.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 6 is a flow diagram illustrating an example process 600 for generating a candidate trajectory that changes driving lanes to a target driving lane, identify relevant object(s) in the target driving lane, determine a lane change cost associated with the candidate trajectory based on the object(s), and control the vehicle based on the lane change cost. As described below, the example process 600 may be performed by one or more computer-based components configured to implement various functionalities described herein. For instance, process 600 may be performed by a planning component 202. As described above, the planning component 202 may be integrated as an on-vehicle system in some examples. However, in other examples, the planning component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the planning component may generate a candidate trajectory associated with a vehicle navigating to a laterally adjacent driving lane. The planning component may generate, select, and/or follow multiple candidate trajectories through the environment. In some instances, the candidate trajectories may include instructions that instruct the vehicle how to navigate a portion of the environment. The candidate trajectories can include instructions that cause the vehicle to perform various types of actions, such as remain in the same lane, lane change left, lane change right, pass an object proximate the vehicle, modify vehicle kinematics (e.g., velocity, acceleration, etc.), and/or any other type of action. In some examples, a candidate trajectory may include multiple predicted states that can represent the state information of the vehicle at a specific location along the candidate trajectory. State information may include location data, pose data (e.g., lateral offset data, longitudinal offset data, heading offset data), velocity data, acceleration data, and/or other types of data.

At operation 604, the planning component may receive sensor data associated with an environment. That is, the vehicle may include one or more sensor devices (e.g., lidar device(s), radar device(s), image capturing device(s), time-of-flight device(s), infrared device(s), etc.) located and/or mounted at various locations and/or angles in and/or on the vehicle.

At operation 606, the planning component may detect an object based on the sensor data. In such cases, the vehicle may receive sensor data for the sensor(s) and analyze such data to detect an object within the environment. Based on identifying object(s) within the environment, the vehicle may determine whether such objects are relevant to the vehicle. Techniques for identifying relevant objects may be found, for example, in U.S. patent application Ser. No. 18/132,289 entitled "Machine-Learned Model for Detecting Object Relevance to Vehicle Operation Planning" filed on Apr. 7, 2023, in U.S. patent application Ser. No. 18/394,908 entitled "Identifying Relevant Objects Based on Artificial Paths" filed Dec. 22, 2023, and in U.S. patent Ser. No. 17/854,269 entitled "Identifying Relevant Objects Within an Environment," filed on Jun. 30, 2022, the entire contents of each are hereby incorporated by reference herein for all purposes.

At operation 608, the planning component may determine whether the object is in the laterally adjacent driving lane. In some examples, upon detecting the object, the vehicle may determine one or more additional features associated with the object such as position data, predicted velocity, predicted acceleration, predicted steering angle, etc. As such, the planning component may analyze the one or more object(s) to determine whether one or more of the objects are located within the target driving lane (e.g., a laterally adjacent driving lane to which a candidate trajectory enters). The vehicle may determine that a relevant object is in (or otherwise occupies) the target driving lane based on identifying a location of the object and determining that the location of the object overlaps with the location of the target driving lane. As such, if the object is not located in the adjacent driving lane (608: No), the planning component may not include the object in the evaluation of a lane changing cost. That is, at operation 610, the planning component may determine not to include the object in the lane change cost.

In contrast, if the object is located in the adjacent driving lane (608: Yes), the planning component may consider the object in the lane change cost determination. Specifically, at operation 612, the planning component may determine an amount of ROW associated with the object within the laterally adjacent driving lane. The ROW score may represent an amount of ROW the object has in the target driving lane. Techniques for determining a ROW may be found, for example, in U.S. patent application Ser. No. 17/850,348 titled "Determining Right of Way," filed on Jun. 27, 2022, the entire contents are hereby incorporated by reference herein for all purposes.

At operation 614, the planning component may determine a lane change cost associated with following the candidate trajectory into the laterally adjacent driving lane. In some examples, the planning component may evaluate the candidate trajectories to determine whether the trajectories violate the ROW of the object(s). That is, the planning component may input the candidate trajectories into a tree structure and determine various types of costs, one of which being a cost the measures the cost of performing the lane change maneuver relative to the relevant object. When determining lane changing cost, the planning component may determine one or more sub-costs that may be used to generate the lane changing cost. The lane changing cost may represent the degree to which the vehicle violates the ROW of the object(s) in the target lane. Further, the lane changing cost may be a combination of one or more sub-costs. The sub-costs may include, for example, a time-gap cost, a longitudinal time-to-collision (or longitudinal TTC), a distance-based cost, a lateral TTC, a deceleration cost, and/or any other type of cost. In such examples, the planning component may determine a separate cost value for one or more of the sub-costs and combine such cost value(s) into a single cost value which may represent the lane changing cost. Based on determining the one or more sub-costs described above, the planning component may combine the sub-costs into a single lane changing cost. In various examples, differing sub-cost types may be associated with differing weights based on, for example, importance.

At operation 616, the planning component may determine modified lane change cost by combining the amount of ROW with the lane change cost. Additionally or alternatively, the planning component may determine a modified lane changing cost by combining a ROW score of the object with the lane changing cost. Accordingly, the planning component may scale the lane changing cost by multiplying the ROW score with the lane changing cost. In such cases, the planning component may use the modified lane changing cost in the tree structure. However, this is not to be limiting; in some examples, the planning component may generate the lane change cost based on the amount of ROW of the object.

At operation 618, the planning component may control the vehicle based on the modified lane change cost. Upon determining the lane changing cost (or the modified lane changing cost) and the one or more other sub-costs, the planning component may determine or otherwise combine the sub-costs into a single overall cost. In various examples, differing cost types may be associated with differing weights based on, for example, importance. As a non-limiting examples, a safety cost may be associated with a higher weight than a comfort cost. Further, such costs may be weighted differently, and as such, different costs may affect the overall cost in different proportions. In some examples, the vehicle may determine to follow a control trajectory that has the lowest overall cost compared to the overall costs of other potential traversal paths between the candidate trajectories.

In some examples, the vehicle may follow the control trajectory while operating within the environment. Upon determining the control trajectory from the tree search, the vehicle may follow the control trajectory throughout the environment.

Example Clauses

A: A system comprising: one or more processors; and one or more non-transitory computer-readable media storing computer-executable instructions that, when executed, cause the system to perform operations comprising: receiving, from a sensor associated with a vehicle, sensor data associated with an environment; detecting, based at least in part on the sensor data, an object; determining that the vehicle is traveling in a first driving lane in the environment; generating a candidate trajectory for the vehicle to follow; determining that a portion of the candidate trajectory is associated with the vehicle navigating to a second driving lane that is laterally adjacent to the first driving lane; determining that the object is relevant; determining, based at least in part on the object being relevant, that the object is located in the second driving lane; determining, based at least in part on the object being located in the second driving lane, a right-of-way metric associated with the object within the second driving lane; determining, based at least in part on the right-of-way metric, a lane changing cost associated with following the candidate trajectory into the second driving lane; and controlling the vehicle based at least in part on the lane changing cost.

B: The system of paragraph A, wherein determining the lane changing cost is based at least in part on: determining a longitudinal distance between vehicle and the object; determining, based at least in part on the sensor data, an object velocity; determining, based at least in part on the longitudinal distance and the object velocity, a period of time for the object to travel the longitudinal distance; and determining, based at least in part on the period of time, the lane changing cost.

C: The system of paragraph B, wherein the longitudinal distance and the object velocity are determined at a simulation time associated with a front portion of the vehicle intersecting with a lane marking that divides the first driving lane and the second driving lane.

D: The system of paragraph A, wherein determining the lane changing cost is based at least in part on: determining a longitudinal distance between vehicle and the object; determining, based at least in part on a trajectory of the object and the candidate trajectory, a relative velocity; determining, based at least in part on the longitudinal distance and a longitudinal component of the relative velocity, a period of time for at least one of the object or the vehicle to travel the longitudinal distance; and determining, based at least in part on the period of time, the lane changing cost.

E: The system of paragraph A, wherein determining that the candidate trajectory is associated with the second driving lane is based at least in part on: identifying a state of the candidate trajectory; and determining that the state overlaps with a region of the environment associated with the second driving lane.

F: One or more non-transitory computer-readable media storing instructions executable by one or more processors, wherein the instructions, when executed, cause a system to perform operations comprising: generating a candidate trajectory associated with a first driving lane and a second driving lane; detecting, based at least in part on sensor data, an object; determining, based at least in part on the object, a right-of-way metric associated with the object; determining that the right-of-way metric meets or exceeds a threshold right-of-way; and determining, based at least in part on the right-of-way metric meeting or exceeding the threshold right-of-way, a lane changing cost associated with a portion of the candidate trajectory that is associated with the second driving lane.

G: The one or more non-transitory computer-readable media of paragraph F, wherein determining the lane changing cost is based at least in part on: determining a score representing whether a vehicle is in front of the object; and determining, based at least in part on the score, that the vehicle is in front of the object.

H: The one or more non-transitory computer-readable media of paragraph F, wherein determining the lane changing cost is based at least in part on determining that the object is relevant to a vehicle.

I: The one or more non-transitory computer-readable media of paragraph F, wherein determining the lane changing cost is based at least in part on: determining a longitudinal distance between vehicle and the object; determining, based at least in part on the sensor data, an object velocity; determining, based at least in part on the longitudinal distance and the object velocity, a period of time for the object to travel the longitudinal distance; and determining, based at least in part on the period of time, the lane changing cost.

J: The one or more non-transitory computer-readable media of paragraph I, wherein the longitudinal distance and the object velocity are determined at a simulation time associated with a front portion of the vehicle intersecting with a lane marking that divides the first driving lane and the second driving lane.

K: The one or more non-transitory computer-readable media of paragraph F, wherein determining the lane changing cost is based at least in part on: determining a longitudinal distance between vehicle and the object; determining, based at least in part on a trajectory of the object and the candidate trajectory, a relative velocity; determining, based at least in part on the longitudinal distance and a longitudinal component of the relative velocity, a period of time for at least one of the object or the vehicle to travel the longitudinal distance; and determining, based at least in part on the period of time, the lane changing cost.

L: The one or more non-transitory computer-readable media of paragraph F, wherein determining that the candidate trajectory is associated with the second driving lane is based at least in part on: identifying a state of the candidate trajectory; and determining that the state is associated with a region of an environment associated with the second driving lane.

M: The one or more non-transitory computer-readable media of paragraph F, wherein determining the lane changing cost is based at least in part on: determining a lateral distance between vehicle and the object; determining, based at least in part on a lateral component of the candidate trajectory, a period of time for at least one of the object or the vehicle to travel the lateral distance; and determining, based at least in part on the period of time, the lane changing cost.

N: The one or more non-transitory computer-readable media of paragraph F, wherein determining the lane changing cost is based at least in part on: determining a longitudinal distance between a vehicle and the object; determining, based at least in part on a trajectory of the object and the candidate trajectory, a relative velocity; determining a reaction time associated with the object; determining, based at least in part on longitudinal distance, the relative velocity, and the reaction time, a modified distance; determining, based at least in part on the modified distance and the relative velocity, an acceleration or a deceleration value; and determining, based at least in part on the acceleration or the deceleration value, the lane changing cost.

O: The one or more non-transitory computer-readable media of paragraph F, wherein determining the lane changing cost is based at least in part on: determining a longitudinal distance between a vehicle and the object; determining, based at least in part on a trajectory of the object and the candidate trajectory, a relative velocity and a relative acceleration; determining, based at least in part on the relative acceleration and the relative velocity, a modified relative velocity; determining, based at least in part on the longitudinal distance and the modified relative velocity, a modified longitudinal distance; and determining, based at least in part on the modified longitudinal distance, the lane changing cost.

P: A method comprising: generating a candidate trajectory associated with a first driving lane and a second driving lane; detecting, based at least in part on sensor data, an object; determining, based at least in part on the object, a right-of-way metric associated with the object; determining that the right-of-way metric meets or exceeds a threshold right-of-way; and determining, based at least in part on the right-of-way metric meeting or exceeding the threshold right-of-way, a lane changing cost associated with a portion of the candidate trajectory that is associated with the second driving lane.

Q: The method of paragraph P, wherein determining the lane changing cost is based at least in part on: determining a score representing whether a vehicle is in front of the object; and determining, based at least in part on the score, that the vehicle is in front of the object.

R: The method of paragraph P, wherein determining the lane changing cost is based at least in part on determining that the object is relevant to a vehicle.

S: The method of paragraph P, wherein determining the lane changing cost is based at least in part on: determining a longitudinal distance between vehicle and the object; determining, based at least in part on the sensor data, an object velocity; determining, based at least in part on the longitudinal distance and the object velocity, a period of time for the object to travel the longitudinal distance; and determining, based at least in part on the period of time, the lane changing cost.

T: The method of paragraph S, wherein the longitudinal distance and the object velocity are determined at a simulation time associated with a front portion of the vehicle intersecting with a lane marking that divides the first driving lane and the second driving lane.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving, from a sensor associated with a vehicle, sensor data associated with an environment;
detecting, based at least in part on the sensor data, an object;
determining that the vehicle is traveling in a first driving lane in the environment;

generating a candidate trajectory for the vehicle to follow;

determining that a portion of the candidate trajectory is associated with the vehicle navigating to a second driving lane that is laterally adjacent to the first driving lane;

determining that the object is relevant;

determining, based at least in part on the object being relevant, that the object is located in the second driving lane;

determining, based at least in part on the object being located in the second driving lane, a right-of-way metric associated with the object within the second driving lane;

determining a score representing a position of the object relative to the vehicle;

determining, based at least in part on the score and the right-of-way metric, a lane changing cost associated with following the candidate trajectory into the second driving lane; and controlling the vehicle based at least in part on the lane changing cost.

2. The system of claim 1, wherein determining the lane changing cost is based at least in part on:

determining a longitudinal distance between the vehicle and the object;

determining, based at least in part on the sensor data, an object velocity;

determining, based at least in part on the longitudinal distance and the object velocity, a period of time for the object to travel the longitudinal distance; and determining, based at least in part on the period of time, the lane changing cost.

3. The system of claim 2, wherein the longitudinal distance and the object velocity are determined at a simulation time associated with a front portion of the vehicle intersecting with a lane marking that divides the first driving lane and the second driving lane.

4. The system of claim 1, wherein determining the lane changing cost is based at least in part on:

determining a longitudinal distance between the vehicle and the object;

determining, based at least in part on a trajectory of the object and the candidate trajectory, a relative velocity;

determining, based at least in part on the longitudinal distance and a longitudinal component of the relative velocity, a period of time for at least one of the object or the vehicle to travel the longitudinal distance; and determining, based at least in part on the period of time, the lane changing cost.

5. The system of claim 1, wherein determining that the candidate trajectory is associated with the second driving lane is based at least in part on:

identifying a state of the candidate trajectory; and determining that the state overlaps with a region of the environment associated with the second driving lane.

6. One or more non transitory computer readable media storing instructions executable by one or more processors, wherein the instructions, when executed, cause a system to perform operations comprising:

generating a candidate trajectory associated with a first driving lane and a second driving lane;

detecting, based at least in part on sensor data, an object;

determining, based at least in part on the object, a right-of-way metric associated with the object;

determining that the right-of-way metric meets or exceeds a threshold right-of-way;

determining a score representing a position of the object relative to a vehicle;

determining, based at least in part on the score and the right-of-way metric meeting or exceeding the threshold right-of-way, a lane changing cost associated with a portion of the candidate trajectory that is associated with the second driving lane; and controlling the vehicle based at least in part on the lane changing cost.

7. The one or more non transitory computer readable media of claim 6, wherein determining the lane changing cost is based at least in part on:

determining, based at least in part on the score, that the vehicle is in front of the object.

8. The one or more non transitory computer readable media of claim 6, wherein determining the lane changing cost is based at least in part on determining that the object is relevant to the vehicle.

9. The one or more non transitory computer readable media of claim 6, wherein determining the lane changing cost is based at least in part on:

determining a longitudinal distance between the vehicle and the object;

determining, based at least in part on the sensor data, an object velocity;

determining, based at least in part on the longitudinal distance and the object velocity, a period of time for the object to travel the longitudinal distance; and determining, based at least in part on the period of time, the lane changing cost.

10. The one or more non transitory computer readable media of claim 9, wherein the longitudinal distance and the object velocity are determined at a simulation time associated with a front portion of the vehicle intersecting with a lane marking that divides the first driving lane and the second driving lane.

11. The one or more non transitory computer readable media of claim 6, wherein determining the lane changing cost is based at least in part on:

determining a longitudinal distance between the vehicle and the object;

determining, based at least in part on a trajectory of the object and the candidate trajectory, a relative velocity;

determining, based at least in part on the longitudinal distance and a longitudinal component of the relative velocity, a period of time for at least one of the object or the vehicle to travel the longitudinal distance; and determining, based at least in part on the period of time, the lane changing cost.

12. The one or more non transitory computer readable media of claim 6, wherein determining that the candidate trajectory is associated with the second driving lane is based at least in part on:

identifying a state of the candidate trajectory; and determining that the state is associated with a region of an environment associated with the second driving lane.

13. The one or more non transitory computer readable media of claim 6, wherein determining the lane changing cost is based at least in part on:

determining a lateral distance between the vehicle and the object;

determining, based at least in part on a lateral component of the candidate trajectory, a period of time for at least one of the object or the vehicle to travel the lateral distance; and determining, based at least in part on the period of time, the lane changing cost.

14. The one or more non transitory computer readable media of claim 6, wherein determining the lane changing cost is based at least in part on:

determining a longitudinal distance between the vehicle and the object;

determining, based at least in part on a trajectory of the object and the candidate trajectory, a relative velocity;

determining a reaction time associated with the object;

determining, based at least in part on the longitudinal distance, the relative velocity, and the reaction time, a modified distance;

determining, based at least in part on the modified distance and the relative velocity, an acceleration or a deceleration value; and determining, based at least in part on the acceleration or the deceleration value, the lane changing cost.

15. The one or more non transitory computer readable media of claim 6, wherein determining the lane changing cost is based at least in part on:

determining a longitudinal distance between the vehicle and the object;

determining, based at least in part on a trajectory of the object and the candidate trajectory, a relative velocity and a relative acceleration;

determining, based at least in part on the relative acceleration and the relative velocity, a modified relative velocity;

determining, based at least in part on the longitudinal distance and the modified relative velocity, a modified longitudinal distance; and determining, based at least in part on the modified longitudinal distance, the lane changing cost.

16. A method comprising:

generating a candidate trajectory associated with a first driving lane and a second driving lane;

detecting, based at least in part on sensor data, an object;

determining, based at least in part on the object, a right-of-way metric associated with the object;

determining that the right-of-way metric meets or exceeds a threshold right-of-way;

determining a score representing a position of the object relative to a vehicle;

determining, based at least in part on the score and the right-of-way metric meeting or exceeding the threshold right-of-way, a lane changing cost associated with a portion of the candidate trajectory that is associated with the second driving lane; and controlling the vehicle based at least in part on the lane changing cost.

17. The method of claim 16, wherein determining the lane changing cost is based at least in part on:

determining, based at least in part on the score, that the vehicle is in front of the object.

18. The method of claim 16, wherein determining the lane changing cost is based at least in part on determining that the object is relevant to the vehicle.

19. The method of claim 16, wherein determining the lane changing cost is based at least in part on:

determining a longitudinal distance between the vehicle and the object;

determining, based at least in part on the sensor data, an object velocity;

determining, based at least in part on the longitudinal distance and the object velocity, a period of time for the object to travel the longitudinal distance; and determining, based at least in part on the period of time, the lane changing cost.

20. The method of claim 19, wherein the longitudinal distance and the object velocity are determined at a simulation time associated with a front portion of the vehicle intersecting with a lane marking that divides the first driving lane and the second driving lane.

* * * * *